United States Patent [19]
Decret et al.

[11] 3,924,954
[45] Dec. 9, 1975

[54] HELIOGRAPH

[75] Inventors: Jean-Claude Decret, Seyssinet-Pariset; Pierre Denis; Paul Jourdan, both of Grenoble, all of France

[73] Assignees: Commissariat a l'Energie Atomique; Institut National de la Recherche Agronomique, both of Paris, France

[22] Filed: Apr. 16, 1974

[21] Appl. No.: 461,451

[30] Foreign Application Priority Data
Apr. 20, 1973 France.............................. 73.14538

[52] U.S. Cl. ................. 356/188; 250/227; 356/189
[51] Int. Cl.² ........................................... G01J 3/48
[58] Field of Search ...... 250/227, 347; 356/74, 188, 356/189; 350/21, 22; 116/20

[56] References Cited
UNITED STATES PATENTS

| | | | |
|---|---|---|---|
| 3,240,106 | 3/1966 | Hicks | 250/227 X |
| 3,510,667 | 5/1970 | Cleveland et al. | 250/227 |
| 3,551,058 | 12/1970 | Dobbs et al. | 356/188 X |

*Primary Examiner*—James B. Mullins
*Attorney, Agent, or Firm*—Cameron, Kerkam, Sutton, Stowell & Stowell

[57] ABSTRACT

The heliograph comprises a light guide having an elbowed upper portion and driven in uniform rotational motion about an axis parallel to the earth's axis at an angular velocity which exceeds the velocity of rotation of the earth on its axis, a stationary photodetector placed beneath the lower end of the guide, and electronic means for analyzing the electrical signals delivered by the photodetector.

10 Claims, 9 Drawing Figures

HELIOGRAPH

The present invention relates to a heliograph and finds an application especially in the measurement of the time of exposure to solar radiation or in the measurement of atmospheric pollution.

Many different types of heliographs have already been constructed and employed with varying degrees of success. Among the known types which are worthy of mention are the Campbell-Stokes, Jordan, Marvin, Foster heliographs, a detailed description of which can be found in the guide of instruments and meteorological observations, 2nd Edition OMM No 8 TP. 3, Supplement No 5, August, 1965, Chapter 9, pages 34 to 38. These are delicate instruments which are not easy to operate and are not readily suited to electronic processing of detected signals. The precise aim of the present invention is to provide a heliograph which is of more simple design than known instruments and does not call for the use either of a heliostat or of an equatorial and which, in addition, is well suited to conventional electronic counting circuits.

In precise terms, the present invention is directed to a heliograph which comprises:
 — a light guide having an axis parallel to the earth's axis and driven by suitable means in a uniform movement of rotation about its axis at an angular velocity which is higher than the velocity of rotation of the earth on its own axis, the upper portion of said guide being elbowed with respect to the axis,
 — a stationary photodetector placed beneath the lower end of said guide,
 — electronic means for analyzing the electrical signals delivered by said receiver.

The velocity of rotation of the guide is preferably of high value compared with the velocity of rotation of the earth on its axis.

In one advantageous embodiment, the upper elbowed portion of the guide makes an angle of 90° with the axis of rotation of the complete assembly.

In a number of different preferential embodiments, the light guide which has any transverse cross-section such as a circular or rectangular cross-section, for example, is composed of glasses having different refractive indices. In particular, a glass of lower refractive index can cover the external surface of the guide.

The guide can also be constituted by a glass having a refractive index which varies continuously from the core to the periphery so as to constitute an optical fiber of large cross-sectional area. However, the guide can also be constituted by a plurality of optical fibers each having a small cross-sectional area.

Depending on the nature of the measuring means, the heliograph according to the invention is capable of performing at least three functions. If said means are constituted by a photodetector placed behind the light guide, said photodetector receives the sun's rays at each revolution of the guide and thus delivers a series of pulses during the entire period of exposure to solar radiation; an electronic counter connected to the output of said detector then provides a direct indication of the time of exposure to solar radiation.

The photodetector can be associated with spectral filters, especially of the interferential type, in which case the instrument performs an analysis in one or a number of spectral regions.

Finally, the optical measuring means can be constituted by a spectrometer of conventional type for carrying out a complete spectrum analysis of solar radiation.

In all cases, it is possible to associate with the detector electronic circuits in which provision is made in particular for synchronous amplifiers in order to derive benefit from the fact that the electrical pulses delivered by the photodetector are periodic, the period being that of the movement of rotation of the light guide of the heliograph. This makes it possible to eliminate spurious signals produced in particular by ambient illumination.

The characteristic features and advantages of the invention will in any case become more readily apparent from the following description of examples of construction which are given by way of explanation without any limitation being implied, reference being made to the accompanying drawings, in which.

Figure 1:
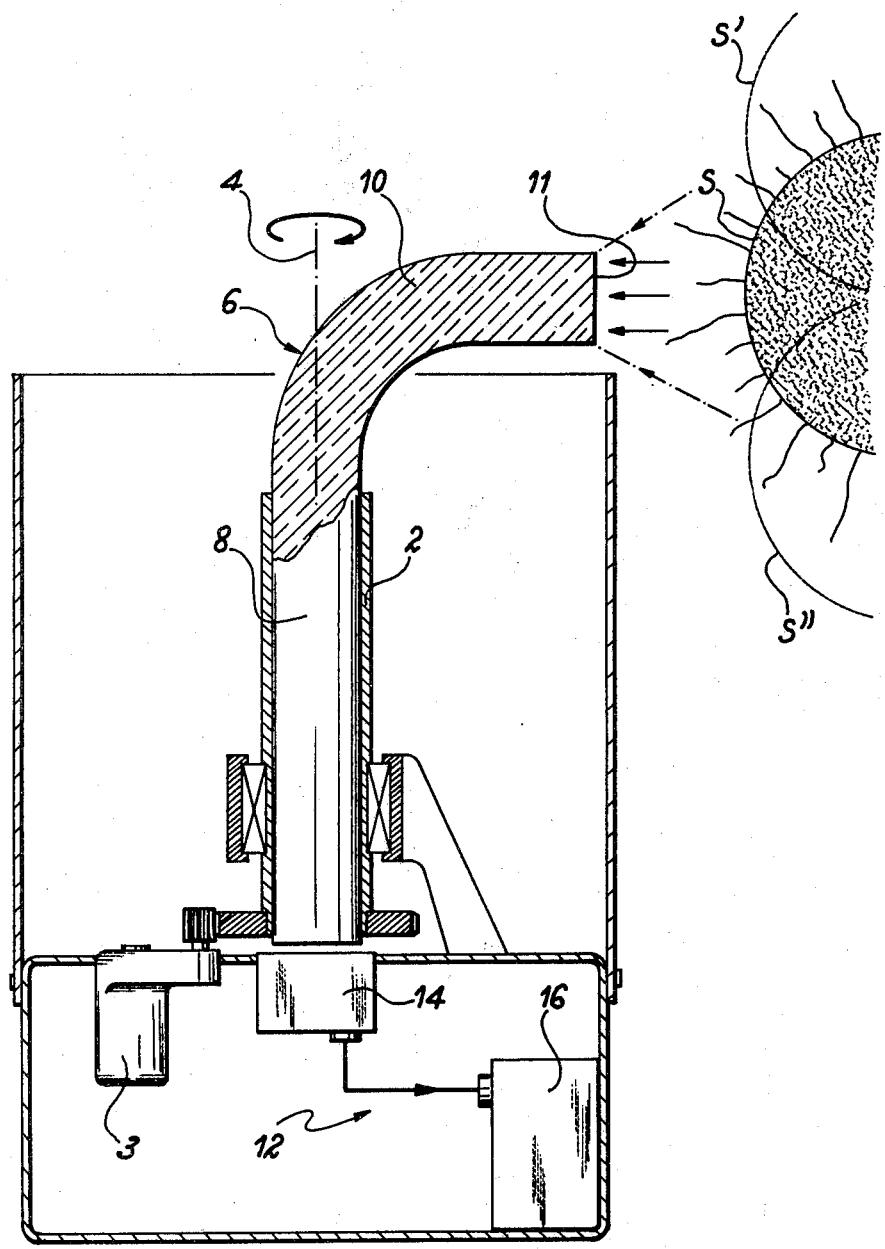
FIG. 1 is a diagram of the heliograph according to the invention in the case of a guide which is elbowed at an angle of 90°.

The heliograph illustrated in FIG. 1 essentially comprises a tube 2 mounted so as to be capable of rotating about the axis 4 which is parallel to the earth's axis. This movement of rotation is produced by the motor 3. One extremity 8 of a light guide 6 is engaged in the cylinder 2 whilst the other extremity 10 is at right angles to the first and directed towards the sun. Stationary analytical means 12 are placed at the other end of the tube 2 and comprise in particular a photodetector 14 and electronic circuits 16 for processing the signal delivered by the photodetector 14. The velocity of rotation of the cylinder 2 is constant and of high value with respect to the velocity of rotation of the earth on its own axis.

The operation of said device is as follows. The sun's rays fall onto the heliograph at right angles to the axis 4 twice during the year, when the sun is at the vernal point and at the opposite point (position S). On the contrary, on June 21st and December 21st, said rays make an angle of ± 23°30' with the normal to the axis 4 (positions S' and S''). At each revolution of the instrument, the light guide 6 receives the sun's rays on that face 11 which is directed towards the sun. As a result of total reflections from its walls, the guide 6 directs the light rays to the portion 8 of the guide which is located within the cylinder 2. The rays then impinge upon the detector 14. At the exit of said detector, an electrical pulse is accordingly observed each time the guide 10 is located opposite to the sun although, strictly speaking, this is attended by a slight time-lag from one pulse to the next owing to the sun's motion during the revolution of the tube. Since the tube rotates rapidly with respect to the apparent motion of the sun on the local sphere, said time-lag is of extremely small value and will not be taken into account in the following description.

Outside the vernal point, the sun's rays therefore reach the guide at a certain angle with respect to the normal to the axis 4. This phenomenon is of no importance, however, by reason of the fact that, as can be seen from FIG. 2, the angle of 23°30' which represents the maximum angular difference is not of sufficient value to bring about the result that the conditions of total reflection within the light guide are no longer satisfied.

Figure 2:
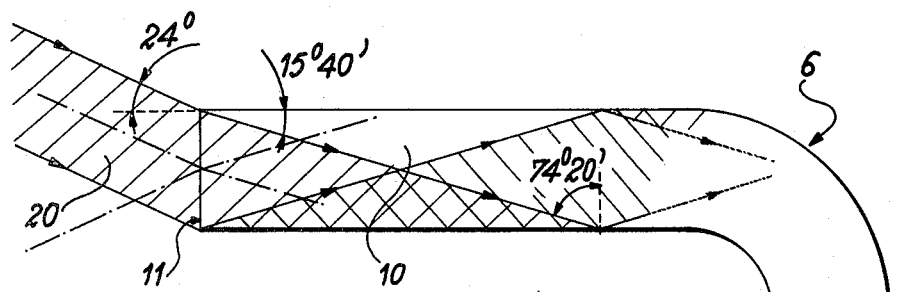
FIG. 2 is a diagram showing the influence of the declination of the sun on the path of the light rays within the light guide.

FIG. 2 in fact illustrates the influence of the declination of the sun on the path of the light rays within the light guide. The portion of the guide which is shown in the figure is perpendicular to the axis of rotation; the face 11 receives the rays 20 emitted by the sun. In the case of a light guide formed of glass having a refractive index of 1.5 and placed in the surrounding air, the limiting angle of total reflection is approximately 48°. In the case of a maximum angle of incidence of 24°, it is readily apparent that the corresponding angle of refraction within the interior of the guide 10 is 15°40'', which corresponds to an angle of incidence of 74°20' on the walls which is larger than the angle of 48° from which the total reflection from the guide walls is observed. The detector which is located at the other end of the device therefore always receives a luminous flux corresponding to the solar rays which have undergone a certain number of total reflections from the guide walls; the intensity of said luminous flux varies as the cosine of the angle of declination but this is of no importance in view of the fact that, at least in the event that it is desired to measure the time of exposure to solar radiation, the measurement is performed by counting the pulses delivered by the detector but not necessarily by analyzing the amplitude of said pulses. In any case, it is always possible insofar as requirements dictate, to correct the amplitude of the detected pulses by means of a coefficient which is proportional to the cosine of the declination.

During the period of exposure to solar radiation, the detector 14 therefore generates one pulse at each revolution of the cylinder 2. These pulses are counted in the usual manner in an electronic circuit 16 and this latter displays directly a number which is proportional to the period of exposure at the location of the heliograph. The counter 16 can be a simple apparatus of the scaler type which does not take into account the amplitude of the pulses which it receives; but it is also possible to make use of a more complex apparatus such as a multichannel selector for counting the number of pulses which have a given amplitude.

Figure 3:
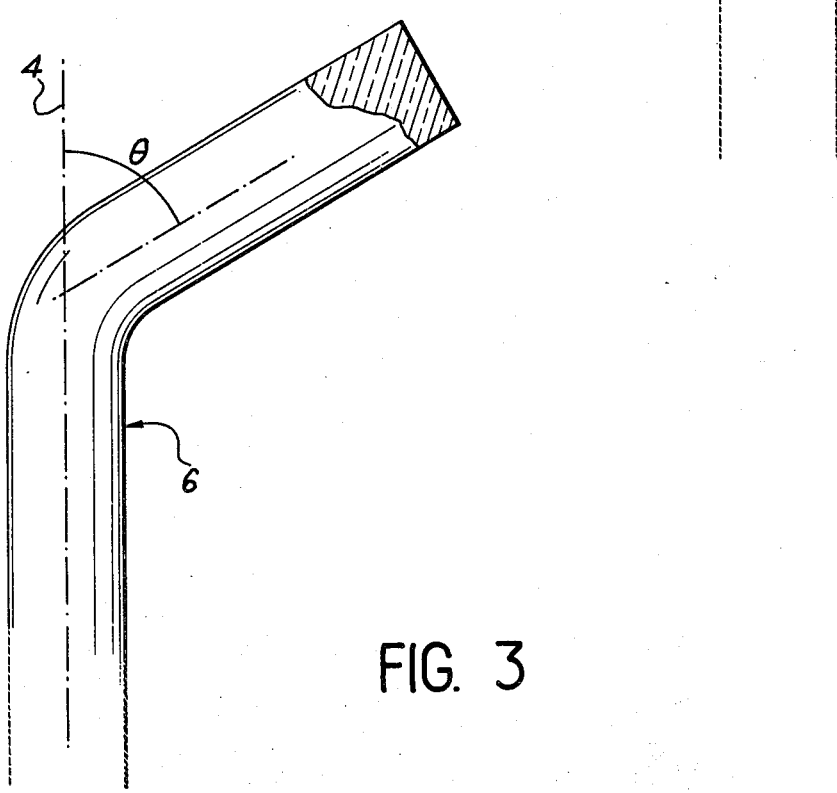
FIG. 3 illustrates a guide in which the angle $\theta$ of the elbowed portion is no longer 90° but of any desired value.

The heliograph of the present invention is not necessarily constituted by a 90° elbowed guide placed within a tube. Said tube can be dispensed with whereas the guide can be bent at an angle $\theta$ which is different from 90° and either smaller than 90° as shown in FIG. 3 or larger than 90°.

Figure 4:
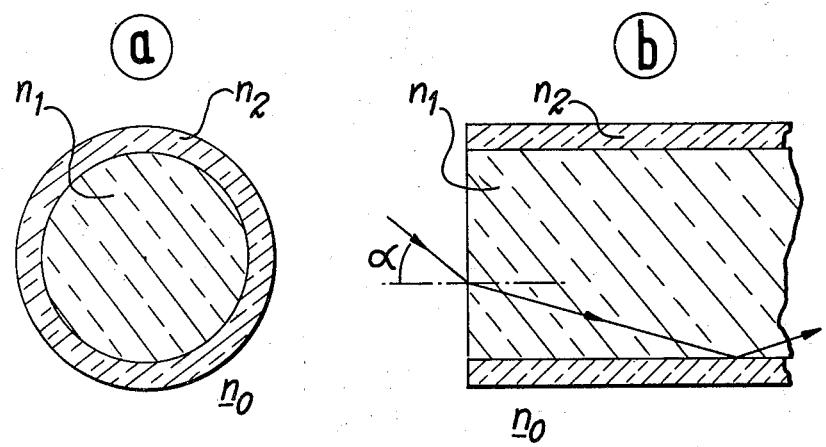
FIG. 4 shows diagrammatically a circular section guide in which the core is formed of glass having a refractive index $n_1$ and the periphery is formed of glass having a refractive index $n_2$.

The light guide may be composite or in other words constituted by materials having different refractive indices. In FIG. 4, the guide has a circular cross-section and is constituted by a glass having a refractive index $n_1$ which forms the core of the guide and by a glass having a refractive index $n_2$ which is placed at the periphery. The index $n_2$ is lower than the index $n_1$ in order to obtain total reflection at the interface between the two glasses in accordance with known practice. The existence of these two types of glass makes it possible to adjust the conditions of total reflection within the guide as a function of the declination of the sun.

In more exact terms, if $n_0$ designates the refractive index of the external ambient medium, the classical laws of refraction of light can serve to demonstrate that total reflection from the interface between layers having refractive indices $n_1$ and $n_2$ is always obtained if the angle of incidence is smaller than the angle $\alpha$ as defined by the relation:

$$n_0 \sin \alpha = \sqrt{n_1^2 - n_2^2}$$

This relation makes it possible to calculate the index $n_2$ for example from a knowledge of $n_0$ and $n_1$ and the limiting angle $\alpha$.

Figures 5, 6:
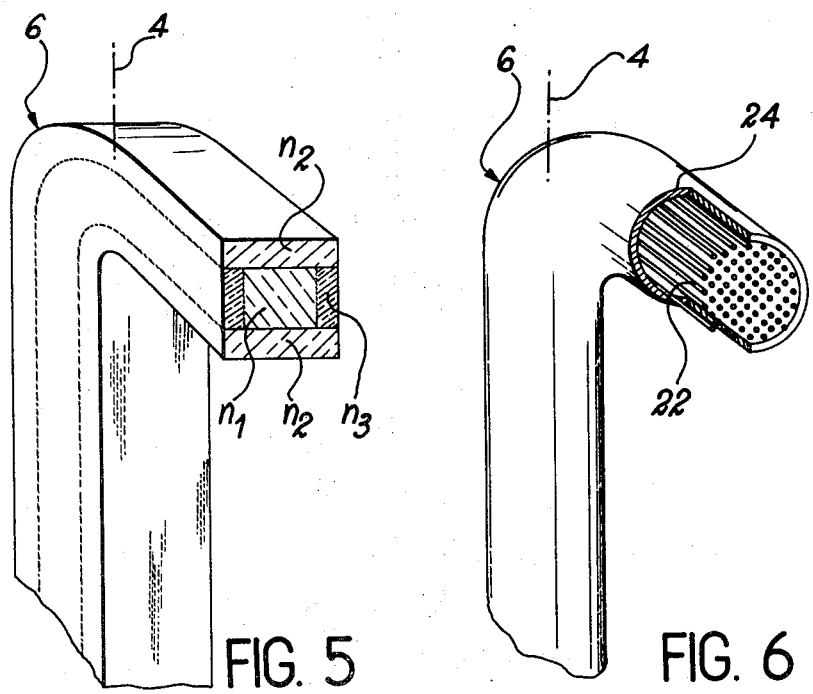
FIG. 5 shows diagrammatically a rectangular section guide in which the core is formed of glass having a refractive index $n_1$ and the walls are formed of glasses having different refractive indices $n_2$ and $n_3$.
FIG. 6 illustrates the case of a guide constituted by a plurality of optical fibers which are grouped together within a sheath.

FIG. 5 illustrates a guide of rectangular cross-section which is composed of a core having a refractive index $n_1$ and opposite walls having refractive indices $n_2$ and/or $n_3$. It is apparent from the foregoing considerations in regard to the conditions of total reflection that the choice of refractive indices $n_1$, $n_2$, $n_3$ makes it possible to adjust the limiting angles of incidence below which total reflection is produced within the guide, this being achieved independently in a plane at right angles to the axis of rotation (as a result of the selective use of the refractive indices $n_1$ and $n_3$) and in a plane which is parallel to the axis (as a result of the selective use of the refractive indices $n_1$ and $n_2$).

There would clearly be no departure from the scope of the invention if the light guide were constituted by a material having a refractive index which decreases continuously from the center to the periphery, for example in accordance with a quadratic law of the type $n = n(0)(1 - a r^2)$, where $n(0)$ is the index at the center, $a$ is a constant and $r$ is the distance from the center.

The light guide 6 can also be formed of a plurality of optical fibers 22 which are tightly held together within a flexible sheath 24 as shown in FIG. 6.

Figure 7:
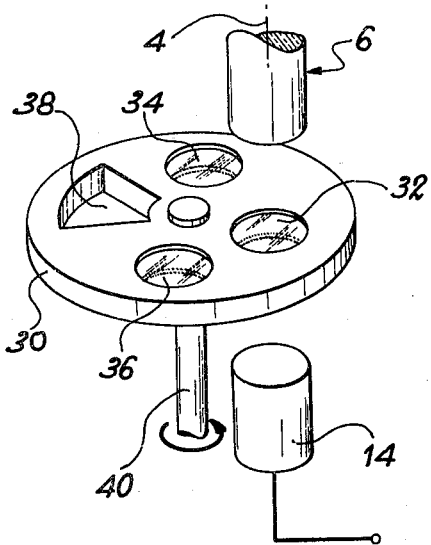
FIG. 7 shows diagrammatically an assembly for rapidly changing the spectral filter between the guide and the receiver.

FIG. 7 shows diagrammatically an arrangement in which a spectral filter can be placed in position and rapidly changed between the light guide and the receiver. In this figure, a support 30 contains a few spectral filters 32, 34, 36 such as interferential filters, for example. The operation of these interferential filters takes place correctly since the light rays issuing from the guide are substantially parallel to each other. Each filter makes it possible to study one range of the spectrum. A pierced zone of the disc designated by the reference 38 permits a study in white light. The disc can be driven in rotation about its axis 40 by manual or automatic means which have not been shown in the figure. This alternative arrangement is advantageously employed in measurements of atmospheric pollution.

In another form of construction of the apparatus, a spectrometer is placed at the exit of the tube 2. By reason of the orientation of the axis 4 with respect to the horizontal plane in which instruments of this type are usually oriented, it is an advantage to place at the exit of the tube 2 a mirror whose normal axis bisects the angle formed by the axis 4 (the earth's axis) and the optical axis of the measuring spectrometer. Under these conditions, the heliograph delivers a light beam of constant direction to the entrance pupil of the spectrometer.

Figure 8:
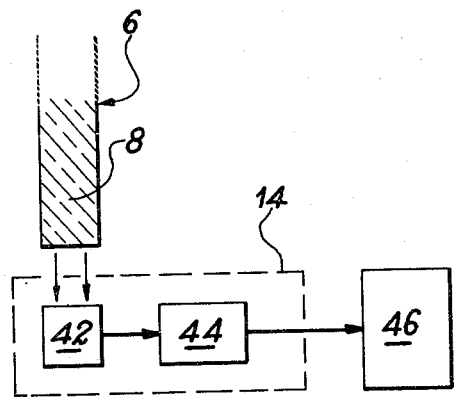
FIG. 8 shows diagrammatically a threshold detection circuit.

In all these alternative embodiments, the photodetector can be associated with a threshold circuit of a type which is known in the field of electronics and which delivers a pulse to the counting circuit only when the pulse delivered by the photodetector is higher than a predetermined and adjustable amplitude. In FIG. 8, the photodetector 14 consists of a conventional photodetector such as a photodiode, for example, followed by a threshold circuit 44 which is connected to the counter 46.

Figure 9:
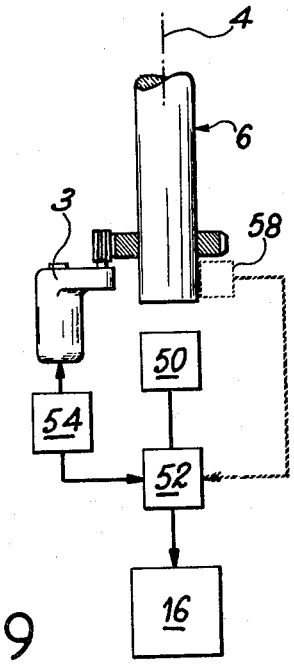
FIG. 9 shows diagrammatically a synchronous detection circuit.

It is also possible to make use of an amplifying circuit tuned to the frequency of rotation of the guide, as shown in FIG. 9. The detector 50 is connected to a synchronous amplifier 52 controlled by a supply circuit 54 which also controls the motor for driving the guide 6. This circuit makes it possible to secure freedom from background and in particular from indirect ambient light. It is also possible to make use of a circuit 58 for measuring the frequency of rotation of the guide 6 and to tune the amplifier 52 accordingly.

What we claim is:

1. A heliograph comprising:
    a light guide having an axis parallel to the earth's axis and driven by means in a uniform movement of rotation about its axis at an angular velocity which is higher than the velocity of rotation of the earth on its own axis, the upper portion of said guide being elbowed with respect to the axis,
    a stationary photodetector placed beneath the lower end of said guide and
    electronic counter means for counting the electrical pulses delivered by said receiver.

2. A heliograph according to claim 1, wherein the axis of the elbowed upper portion of the guide makes an angle of 90° with the axis of rotation.

3. A heliograph according to claim 1, wherein the light guide has a circular transverse cross-section and is composed of two glasses having different refractive indices, the glass which has the higher refractive index being intended to constitute the core of the guide and the glass which has the lower refractive index being intended to constitute the periphery.

4. A heliograph according to claim 1, wherein the light guide has a rectangular transverse cross-section and is composed of two glasses having different refractive indices, the glass which has the higher refractive index being intended to constitute the rectangular-section core of said guide and the glass which has the lower refractive index being intended to cover at least two opposite faces of said core.

5. A heliograph according to claim 1, wherein said light guide is formed of material having a refractive index which decreases from the center to the periphery.

6. A heliograph according to claim 1, wherein the light guide has a rectangular transverse cross-section and is composed of three materials having different refractive indices, the material having the highest refractive index being intended to constitute the core of said guide and the materials which have lower refractive indices being each intended to cover two opposite faces of said guide.

7. A heliograph according to claim 1, wherein said guide is constituted by an assembly of juxtaposed optical fibers.

8. A heliograph according to claim 1, wherein the photodetector is connected to an electronic circuit of the threshold type.

9. A heliograph according to claim 1, wherein at least one spectral filter is placed in front of the photodetector.

10. A heliograph according to claim 9, wherein a movable support fitted with different spectral filters in juxtaposed relation is placed in front of the photodetector, and any one of said filters can be placed in front of said photodetector by manual or automatic displacement of said support.

* * * * *